United States Patent Office 3,684,746
Patented Aug. 15, 1972

3,684,746
COMPOSITION FOR ELECTROSENSITIVE RECORDING PAPER
Kiyoshi Juna and Masuo Tsuchiya, Hiratsuka-shi, Japan, assignors to Kansai Paint Company, Limited, Amagasaki-shi, Japan
No Drawing. Filed Oct. 21, 1970, Ser. No. 82,853
Claims priority, application Japan, Mar. 19, 1970, 45/22,704
Int. Cl. H01b 1/00
U.S. Cl. 252—507          8 Claims

ABSTRACT OF THE DISCLOSURE

Compositions for electrosensitive recording paper are prepared from an epoxy resin, a semiconductive titanium compound doped with a donor impurity, and, if necessary, the metallic soaps of fatty acid.

---

This invention relates to compositions for electrosensitive recording paper used for a facsimile recording medium.

Heretofore, there have been two types of facsimile recording media, that is, one of which is used in a method for recording on an electrosensitive recording paper by breaking a film thereon with electric discharge, and another of which is used in a method for recording on an electrosensitive recording paper by electrolytic reaction of a film on the recording paper.

In the case of the former recording method, there are disadvantages such as that the upper layer of the film of the recording paper is considerably contaminated with carbon, and further that when pressure is applied on a recording medium, the carbon layer is easily pressed to the upper layer of the film whereby the recording paper is contaminated. Since contrast of recording is formed by exposing the carbon of the lower layer to an electric discharge, breakdown of the upper layer of the film occurs.

On the other hand, in the case of the latter recording method, such a recording paper obtained by coating the compositions prepared by dispersing a granulated substance consisting of zinc compound and a very small amount of impurity such as copper into a binder of methacrylate polymer on a base material is employed. In this case, adhesiveness of the coated substance to the base material is inferior so that contrast of recording is inferiorly formed on the recording paper. In other words, it is difficult to obtain favorable contrast in this latter method.

It is an object of the present invention to eliminate the above-mentioned disadvantages by providing novel compositions for electrosensitive recording paper.

According to the present invention, compositions for electrosensitive recording paper are provided in which a titanium compound is utilized and this compound is caused to decompose by electrolytic reaction at a lower voltage than that in a conventional method to obtain metal-free state, whereby semipermanent recording symbols can be formed in a favorable contrast. Thus, compositions for electrosensitive recording paper which do not contaminate the film thereof can be obtained.

The nature, principle, details, and utility of the invention will be more clearly apparent from the following detailed description beginning with general considerations and concluding with specific examples of practice constituting preferred embodiments of the invention.

This invention relates to compositions for electrosensitive recording paper comprising an epoxy resin (1), a semiconductive titanium compound doped with a donor impurity (2), and, if necessary, the metallic soaps of fatty acid (3).

For the epoxy resin employed in this invention, there are, of course, epoxy resins obtained by condensation of epichlorohydrin and bisphenol A, and further, epoxy resins applicable for coating compositions such as resins produced from phenols as starting materials and those produced from aliphatic compounds as starting materials.

The reason that epoxy resins are particularly suitable for the present invention is based on the excellent properties of epoxy resin, that is, excellent adhesiveness with respect to a base material and flexibility in a thin film of the resin containing a large quantity of pigment. Therefore, the excellent effects of the present invention cannot be expected by the use of resins other than epoxy resin.

As the hardeners used for curing these epoxy resins, ordinary hardeners for epoxy resin of coating use, for example, aliphatic amines such as ethylenediamine, diethylenetriamine, triethylenetriamine, monoethanolamine, propanolamine, and aminoethylethanolamine; aromatic amines such as methylphenylenediamine, p,p'-diaminodiphenylmethane, benzylmethylamine, and dimethylaminomethylphenol; polyamide resins such as condensation products of unsaturated aliphatic dimer acids and polyamines; and further, amine adducts may be used. The combination of the epoxy resin (bisphenol A-epichlorohydrin type) and polyamide resin hardener is particularly suitable for this invention.

For the semiconductive titanium compounds doped with a donor impurity employed in this invention, there is employed titanium dioxide doped with a donor impurity of an element selected from the group consisting of niobium, antimony, tantalum, molybdenum, and wolfram. The quantity of a donor impurity to be doped to titanium dioxide is a range of from 0.05 percent by mole to 5.0 percent by mole. A single titanium dioxide doped with a donor impurity may be used and the amount used is within a range of from 150 to 1,000 parts per hundred resin (hereinafter referred to simply as phr.), preferably, from 300 to 600 phr. When the amount of the semiconductive titanium compound doped with impurity is less than 150 phr., there is scarce hiding power of the resulting coating material. When the amount of the titanium compound doped with impurity is more than 1,000 phr., the resulting coating material becomes expensive so that it is disadvantageous from an economic point of view and further, the compositions have lower adhesion to base medium and lower film flexibility. Adding from 600 to 1,000 phr. of the titanium compound doped with impurity to the epoxy resin is scarcely different from the case when the amount of the semiconductive titanium compound used is from 300 to 600 phr. in recording effects. These semiconductive titanium compounds doped with impurity are reduced to free metal by electrolytic reaction.

The metallic soaps of fatty acids employed in this invention are the metallic soaps prepared from metals such as aluminum, copper, zinc, lead, iron, magnesium, cobalt, barium, nickel, and lithium, and fatty acids such as palmitic acid, oleic acid, stearic acid, lauric acid, and caprylic acid. The resulting soaps may be used alone or in a suitable mixture.

Each of these soaps of a fatty acid functions as an agent for flattening the film of the coating material and the soap not only makes recording easier, but also lowers the voltage required to be applied on a recording paper. For this reason, a high voltage is not necessary in the present invention so that breakdown of the film of the coating material due to electric current or electric discharge can be prevented, and further, since the soap has a plasticizing effect with respect to the film, the adhesiveness of the film with respect to a base material and flexibility of the film can be improved.

The amount of the soap of fatty acid used is within a range of from 5 to 80 phr. and preferably, from 10 to 60 phr. When the amount of the metallic soap is less than 5 phr., a high applied voltage becomes necessary resulting in the surface of the film of the coating material becoming coarse and the flexibility thereof deteriorating.

Also, when the amount of the soap is more than 80 phr., a high applied voltage becomes necessary so that the adhesiveness of the coating material with respect to a base material becomes inferior.

Conductive materials including non-metallic conductive materials such as carbon black, graphite, and titanium sesquioxide, metallic conductive materials such as silver and copper, semiconductive intermetallic compounds such as GaP, GaAs, InAs, and InSb may be added alone or in a suitable mixture to the compositions of the present invention, and by the addition of such conductive material, more favorable contrast of recording can be obtained. These conductive materials are effective for attaining the objects of the present invention because the addition of the conductive agent makes it possible to lower the content of the semiconductive titanium compound in the film of the compositions of this invention to such a degree by which the characteristic features of the film are deteriorated, whereby the electric resistance, particularly surface electric resistance of the film can be lowered.

The amount of the non-metallic conductive material used is within the range of from 0.5 to 5 phr. and particularly, from 1 to 3 phr. is preferable. When the amount of the non-metallic conductive material is less than 0.5 phr., the conductivity of the film becomes too small, and when the amount of the conductive material is more than 5 phr., favorable contrast of recording cannot be obtained by the writing signal.

The amount of the metallic conductive material or the semiconductive intermetallic compound used is within a range of from 0.1 to 20 phr. and particularly, from 0.5 to 10 phr. is preferable. When the amount of the metallic conductive or semiconductive intermetallic compound is less than 0.1 phr., there are similar disadvantages as in the lowest limitation of the non-metallic conductive material, and when the amount used of the metallic conductive or semiconductive intermetallic compound is more than 20 phr., the addition becomes economically disadvantageous.

To the compositions above-mentioned, a suitable organic solvent is added and is dispersed and blended by a pebble mill or sand grinder. The thus treated mixture is diluted to a degree such that the viscosity is suitable for coating by the addition of an organic solvent, whereby the composition of the present invention is obtained.

The composition is coated on a base material in such a manner that the thickness of the film is about 10 microns as a dry film and is dried to obtain the electrosensitive recording paper.

For base materials for coating the compositions of the present invention, there are papers or plastic films on which conductive substances such as aluminum, tin, and copper are vapor-deposited or with which these metals are laminated, respectively.

Since in the electrosensitive recording paper prepared by the use of the compositions of this invention, the titanium compound is electrically reduced to free metal, there is no contamination of the recording medium, the adhesiveness of the coated compositions with respect to the paper is better than that of the conventional compositions, and the flexibility of the coated film is also excellent. Accordingly, the long-term preservation of the recording paper of the present invention after recording is favorable. Moreover, in the recording paper of this invention, the recording at a comparatively low voltage is not only possible, but also the favorable contrast of recording can be attained.

In order to indicate still more clearly the nature and utility of the invention, the following specific examples of practice constituting preferred embodiments of the invention and results are set forth, it being understood that these examples are presented as illustrative only, and that they are not intended to limit the scope of the invention.

EXAMPLE 1

450 g. of titanium dioxide doped with 0.5% by mole of niobium, 100 g. of Epon No. 1007 (epoxy resin manufactured by Shell Chemicals Corp.), and 300 g. of methyl ethyl ketone were charged into a pebble mill and dispersed for 20 hours. The contents of the mill were discharged and 4 g. of diethylenetriamine was added thereto. The composition thus obtained was coated on an aluminum laminated and vapor-deposited paper such that the thickness of the coated film after drying was about 10 microns, and the paper thus coated was dried to form the film thereon, thereby obtaining the electrosensitive recording paper.

When a low voltage of 20 volts was applied to two pieces of the paper prepared as described above, a recording having favorable contrast could be obtained.

EXAMPLE 2

250 g. of titanium dioxide doped with 0.5% by mole of niobium and the other components of Example 1 were treated as described therein to prepare a composition. A film of the composition thus prepared was formed on the aluminum layer of a recording paper as in Example 1.

When a low voltage of 23 volts was applied to the recording paper obtained as described above, a recording having favorable contrast could be attained.

EXAMPLE 3

900 g. of titanium dioxide doped with 0.5% by mole of niobium and the other components of Example 1 were treated by similar operations as those of which to prepare a composition. A film of the composition thus prepared was formed on the aluminum layer of a recording paper as in Example 1.

When a low voltage of 20 volts was applied to the recording paper obtained as described above, a recording having favorable contrast could be attained.

EXAMPLE 4

500 g. of titanium dioxide doped with 1.0% by mole of tantalum, 50 g. of Versamid No. 100 (polyamide resin manufactured by General Mills, Inc.), 150 g. of isopropyl alcohol, and 150 g. of toluene were charged into a pebble mill, dispersed for 20 hours and taken out of the mill. To the mixture thus dispersed, 60 g. of zinc stearate was added and agitated for 30 minutes to blend the components. Then, 50 g. of Epon No. 1001 and 50 g. of methyl ethyl ketone were further added thereto to obtain a composition. The composition thus obtained was coated on an aluminum laminated paper such that the thickness of the coated film after drying was about 10 microns, and the paper thus coated was dried to form the film thereon.

When a low voltage of 17 volts was applied to the recording paper prepared as described above, a recording having favorable contrast could be obtained.

EXAMPLE 5

250 g. of titanium dioxide doped with 1.0% by mole of tantalum, 40 g. of copper oleate (instead of zinc stearate in Example 4), and the other components of Example 4 were treated by similar operations as those described therein to prepare a composition.

A film of the composition thus prepared was formed on the aluminum layer of a recording paper as in Example 4.

When a low voltage of 18 volts was applied to the recording paper obtained as described above, a recording having favorable contrast could be attained.

EXAMPLE 6

900 g. of titanium dioxide doped with 1.0% by mole of tantalum, 80 g. of zinc palmitate (instead of zinc stearate in Example 4), and the other components of Example 4 were treated by similar operations as those described therein to prepare a composition.

A film of the composition thus prepared was formed on the aluminum layer of a recording paper as in Example 4.

When a low voltage of 18 volts was applied to the recording paper obtained as described above, a recording having favorable contrast could be attained.

EXAMPLE 7

400 g. of titanium dioxide doped with 1.0% by mole of tantalum, 50 g. (as solid) of Versamid No. 400, 20 g. of aluminum stearate (instead of zinc stearate in Example 4), and the other components of Example 4 were treated by similar operations as those described therein to prepare a composition.

A film of the composition thus prepared was formed on the aluminum layer of a recording paper as in Example 4.

When a low voltage of 18 volts was applied to the recording paper obtained as described above, a recording having favorable contrast could be attained.

EXAMPLE 8

400 g. of titanium dioxide doped with 1.5% by mole of antimony, 30 g. (as solid) of Versamid No. 400, 150 g. of isopropyl alcohol, and 150 g. of toluene were charged into a pebble mill and dispersed for 20 hours and taken out of the mill. To the mixture thus dispersed, 15 g. of aluminum palmitate was added and agitated for 30 minutes to blend the components. Then, 70 g. of Epon No. 1007 and 50 g. of methyl ethyl ketone were further added thereto to obtain a composition. A film of the composition thus prepared was formed on the aluminum layer of a recording paper as in Example 4.

When a low voltage of 18 volts was applied to the recording paper obtained as described above, a recording having favorable contrast could be attained.

EXAMPLE 9

The same components as in Example 4 except for 350 g. of titanium dioxide doped with 0.1% by mole of wolfram, 15 g. of aluminum stearate, and 2 g. of titanium sesquioxide were treated by similar operations as those described therein to prepare a composition.

A film of the composition thus prepared was formed on the aluminum layer of a recording paper as in Example 4.

When a low voltage of 17 volts was applied to the recording paper obtained as described above, a recording having favorable contrast could be obtained.

EXAMPLE 10

The same components as in Example 4 except for 400 g. of titanium dioxide doped with 0.1% by mole of wolfram, 25 g. of zinc caprylate, and 3 g. of silver powder were treated by similar operations as those described therein to prepare a composition.

A film of the composition thus prepared was formed on the aluminum layer of a recording paper as in Example 4.

When a low voltage of 17 volts was applied to the recording paper obtained as described above, a recording having favorable contrast could be attained.

What is claimed is:

1. A composition for an electrosensitive recording material, which comprises an epoxy resin and, in an amount of from 150 to 1000 parts by weight per 100 parts of said resin, titanium dioxide doped with a donor impurity of an element selected from the group consisting of niobium, antimony, tantalum, molybdenum, and wolfram.

2. The composition of claim 1, further including a conductive material selected from the group consisting of:
   (a) a non-metallic conductive material selected from carbon black, graphite and titanium sesquioxide;
   (b) a metallic conductive material selected from silver and copper; and
   (c) a semi-conductive intermetallic material selected from GaP, GaAs, InAs and InSb.

3. The composition of claim 2, wherein the non-metallic conductive material (a) is incorporated in an amount of from 0.5 to 5 parts by weight per 100 parts of the epoxy resin.

4. The composition of claim 2, wherein the metallic conductive material (b) is incorporated in an amount of from 0.1 to 20 parts by weight per 100 parts of the epoxy resin.

5. The composition of claim 2, wherein the semi-conductive intermetallic material (c) is incorporated in an amount of from 0.1 to 20 parts by weight per 100 parts of the epoxy resin.

6. The composition of claim 1, further including as a plasticizer for the composition, a metallic soap of a fatty acid having 8 to 18 carbon atoms, in an amount of from 5 to 80 parts by weight per 100 parts of the epoxy resin.

7. The composition of claim 6, wherein the metallic soap is an aluminum, copper, zinc, lead, iron, magnesium, cobalt, barium nickel or lithium salt of a fatty acid selected from palmitic acid, oleic acid, stearic acid, lauric acid and caprylic acid.

8. The composition of claim 6 further including a conductive material selected from the group consisting of:
   (a) a non-metallic conductive material selected from carbon black, graphite and titanium sesquioxide in an amount of from 0.5 to 5 parts by weight per 100 parts of the epoxy resin;
   (b) a metallic conductive material selected from silver and copper in an amount of from 0.1 to 20 parts by weight per 100 parts of the epoxy resin; and
   (c) a semi-conductive intermetallic material selected from GaP, GaAs, InAs and InSb in an amount of from 0.1 to 20 parts by weight per 100 parts of the epoxy resin.

References Cited

UNITED STATES PATENTS

| | | | |
|---|---|---|---|
| 3,309,198 | 3/1967 | Robillard | 96—1.5 X |
| 3,212,890 | 10/1965 | Kimble et al. | 96—1.8 X |
| 3,130,547 | 6/1964 | Clark | 117—201 X |
| 3,234,017 | 2/1966 | Heyl et al. | 117—201 |

ROBERT F. BURNETT, Primary Examiner

J. C. GIL, Assistant Examiner

U.S. Cl. X.R.

117—201, 221, 226; 204—2; 252—511, 512, 514, 520